US011966725B2

(12) United States Patent
Kanso et al.

(10) Patent No.: US 11,966,725 B2
(45) Date of Patent: Apr. 23, 2024

(54) MICROSERVICE TERMINATION WHILE MAINTAINING HIGH AVAILABILITY

(71) Applicant: MICROSOFT TECHNOLOGY LICENSING, LLC, Redmond, WA (US)

(72) Inventors: Ali Kanso, Kirkland, WA (US); Karthik Maharajan Sankara Subramanian, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 4 days.

(21) Appl. No.: 17/945,003

(22) Filed: Sep. 14, 2022

(65) Prior Publication Data

US 2024/0086160 A1   Mar. 14, 2024

(51) Int. Cl.
*G06F 8/40* (2018.01)
*G06F 8/41* (2018.01)
*G06F 8/65* (2018.01)

(52) U.S. Cl.
CPC .............. *G06F 8/433* (2013.01); *G06F 8/65* (2013.01)

(58) Field of Classification Search
None
See application file for complete search history.

(56) References Cited

U.S. PATENT DOCUMENTS 10,091,061 B1 * 10/2018 Peterson ............ H04L 41/0823
10,445,136 B1 * 10/2019 Roskind ................ G06F 9/505
2018/0063018 A1 * 3/2018 Bosch ................. H04L 47/822

(Continued)

FOREIGN PATENT DOCUMENTS

KR    20220007692 A  *  11/2022

OTHER PUBLICATIONS

Dragoni, et al., "Microservices: How To Make Your Application Scale", In Repository of arXiv:1702.07149v1, Feb. 23, 2017, 10 Pages.

(Continued)

*Primary Examiner* — Philip Wang
(74) *Attorney, Agent, or Firm* — Newport IP, LLC; Jacob P. Rohwer

(57) ABSTRACT

The techniques disclosed herein enable systems to reduce the time required to terminate a set of microservices for an application while ensuring high availability and preventing request failures. This is accomplished through a termination manager which retrieves request queues for the microservices to analyze outstanding requests that require processing prior to termination. Based on the outstanding requests, the termination manager constructs call graphs for each request. The call graphs capture the operational flow of the associated request by defining a sequence of microservices whose functionality is invoked by the request. From an initial analysis, the termination manager can determine that some of the microservices do not appear in the call graphs, indicating that the microservices are not needed to process the outstanding requests. Accordingly, the unneeded microservices are terminated. As requests are processed by the remaining microservices, the termination manager gradually terminates the remaining microservices based on the call graphs.

20 Claims, 12 Drawing Sheets

(56) References Cited

U.S. PATENT DOCUMENTS

2018/0069806 A1* 3/2018 Kumar .................. H04L 47/827
2020/0364035 A1* 11/2020 White ..................... G06F 9/547
2021/0173639 A1* 6/2021 Abadi ...................... G06F 8/75
2021/0263779 A1 8/2021 Haghighat

OTHER PUBLICATIONS

Pardon, et al., "Consistent Disaster Recovery for Microservices: the BAC Theorem", In Journal of IEEE Cloud Computing, vol. 5, Issue: 1, Jan. 2018, 11 pages.

Sama, Michele, "Gracefully handling termination in GO", Retrieved from: https://www.linkedin.com/pulse/playbook-gracefully-handling-termination-go-michele-sama, Feb. 18, 2015, 5 Pages.

International Search Report and Written Opinion received for PCT Application No. PCT/US2023/030751 (MS #412020-PCT01), Nov. 27, 2023, 17 pages.

Shen, et al., "Defuse: A Dependency-Guided Function Scheduler to Mitigate Cold Starts on FaaS Platforms", 2021 IEEE 41st International Conference on Distributed Computing Systems (ICDCS), IEEE, Jul. 7, 2021, pp. 194-204.

* cited by examiner

MICROSERVICE TERMINATION WHILE MAINTAINING HIGH AVAILABILITY

BACKGROUND

In contrast to a traditional monolithic software architecture, modern software applications often utilize a microservice architecture in which the application comprises a plurality of constituent pieces of software known as microservices. In a monolithic architecture, each functional aspect of the software application such as the user interface (UI), business logic, and data access layer, is implemented in a large single piece of software. Conversely, in a microservice architecture, each functional aspect is implemented as a standalone microservice. The microservices are then assembled to implement the software application.

By organizing software applications using the microservice architecture, organizations are enabled to construct complex and scalable software applications. For example, development work for software applications is streamlined as developers and/or engineers can focus on an individual microservice rather than contend with a large and unwieldy piece of software. Moreover, individual microservices can be reused across multiple software applications. In this way, the microservice architecture improves flexibility and reduces the engineering effort required to develop and deploy a software application.

Unfortunately, while the microservice architecture enables efficient and flexible software development, there are also tradeoffs that can negatively impact software applications that utilize a microservice architecture. For example, when upgrading a software application, new versions of each microservice are gradually rolled out to fully deploy a new version of the software application. However, the new version of one microservice may be incompatible with the old version of another microservice. As such, to prevent service outages and dropped requests, the old version of the software application must finish processing any outstanding requests before being terminated and replaced by the new version. In various examples, each microservice is configured with a request queue that tracks outstanding requests for the associated microservice.

Existing approaches for microservice termination typically operate on the assumption that a microservice is eligible for termination if the associated request queue is empty. Stated another way, it is assumed that if a request queue for a microservice is empty then the microservice will not be invoked by any of the remaining outstanding requests. However, as will be discussed below, this assumption is not necessarily accurate and can lead to a microservice being terminated too early. This is because a given request may call on several different microservices and is accordingly passed between the microservices as each one finishes processing the request. As such, early termination can cause failures due to mismatched microservice versions and/or waste time and engineering resources bringing the microservice back online to process additional requests.

SUMMARY

The techniques described herein provide systems for improving microservice termination while improving termination speed and maintaining high service availability by introducing call graph-based microservice termination. This is accomplished by utilizing a termination manager to retrieve and analyze outstanding requests for a plurality of microservices. The termination manager then constructs a call graph for each outstanding request to capture the operational flow of a request through the microservices of the software application. In this way, the termination manager can determine which microservices are still needed to finish processing the outstanding requests. In various examples, the call graph is a data structure such as a tree that defines a sequence microservices whose functionality is invoked by the associated request.

By performing an initial analysis of the call graphs, the termination manager can detect any microservices that do not appear in any of the call graphs. This indicates that these microservices are not needed to process the outstanding requests. In response, the termination manager can immediately terminate the unneeded microservices. By terminating an initial group of microservices, the termination manager reduces the time required to terminate the full set of microservices. In addition, by determining which microservices are not needed, the termination manager can safely terminate microservices without causing cascading issues due to version mismatches or microservice downtime.

As outstanding requests are processed by the remaining microservices the termination manager periodically updates the call graphs associated with each call graph. For example, as a request passes from a first microservice to a second microservice, the termination manager removes the first microservice from the associated call graph. When the microservices finish processing a request, the termination manager reevaluates the call graphs to determine if more microservices can be terminated. Stated another way, the termination manager detects if any microservices that were previously present in the call graphs is no longer present. If a microservice is not present in the call graphs, the termination manager proceeds to terminate the microservice.

The process of periodically updating the call graphs to gradually terminate microservices is repeated until all the microservices that comprise a software application are terminated. At this point the software application is considered terminated. In various examples, new versions of terminated microservices are deployed in response to a termination of a microservice. In this way, the overall software application does not undergo downtime and end users of the software application do not experience disruption to functionality. Moreover, by gradually terminating microservices, the termination manager reduces the time required to terminate the software application. Consequently, a new version of the software application can be quickly deployed.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein improve systems for microservice termination by introducing a termination manager which tracks outstanding requests by constructing a call graph for each outstanding request. A call graph captures the operational flow of a request through the various microservices of a software application. In various examples, the call graph comprises a plurality of nodes where each node represents a microservice whose functionality is invoked by the request. By generating a call graph for each request, the termination manager can determine which microservices are needed immediately as well as at later points in time. In this way, the termination manager prevents microservices from being terminated too early as is the issue with existing approaches for microservice termination. As such, the proposed techniques address a major technical challenge associated with managing microservice-based software architectures.

In another example of the technical benefit of the present disclosure, utilizing call graphs to terminate microservices enables the disclosed system to reduce the amount of time required to complete termination. For example, when generating the initial call graphs, the termination manager can determine that some of the microservices do not appear in any of the call graphs for the outstanding requests. In other words, these microservices are not needed to process the outstanding requests. In response, the termination manger immediately terminates the unneeded microservices. Accordingly, updated versions of the unneeded microservices can be deployed while the remaining requests are processed. Consequently, the termination manager enables rapid deployment of microservice updates thereby improving the efficiency of the software application.

Various examples, scenarios, and aspects that enable rapid microservice termination while maintaining high service availability are described below with respect to FIGS. 1-7.

Figure 1:
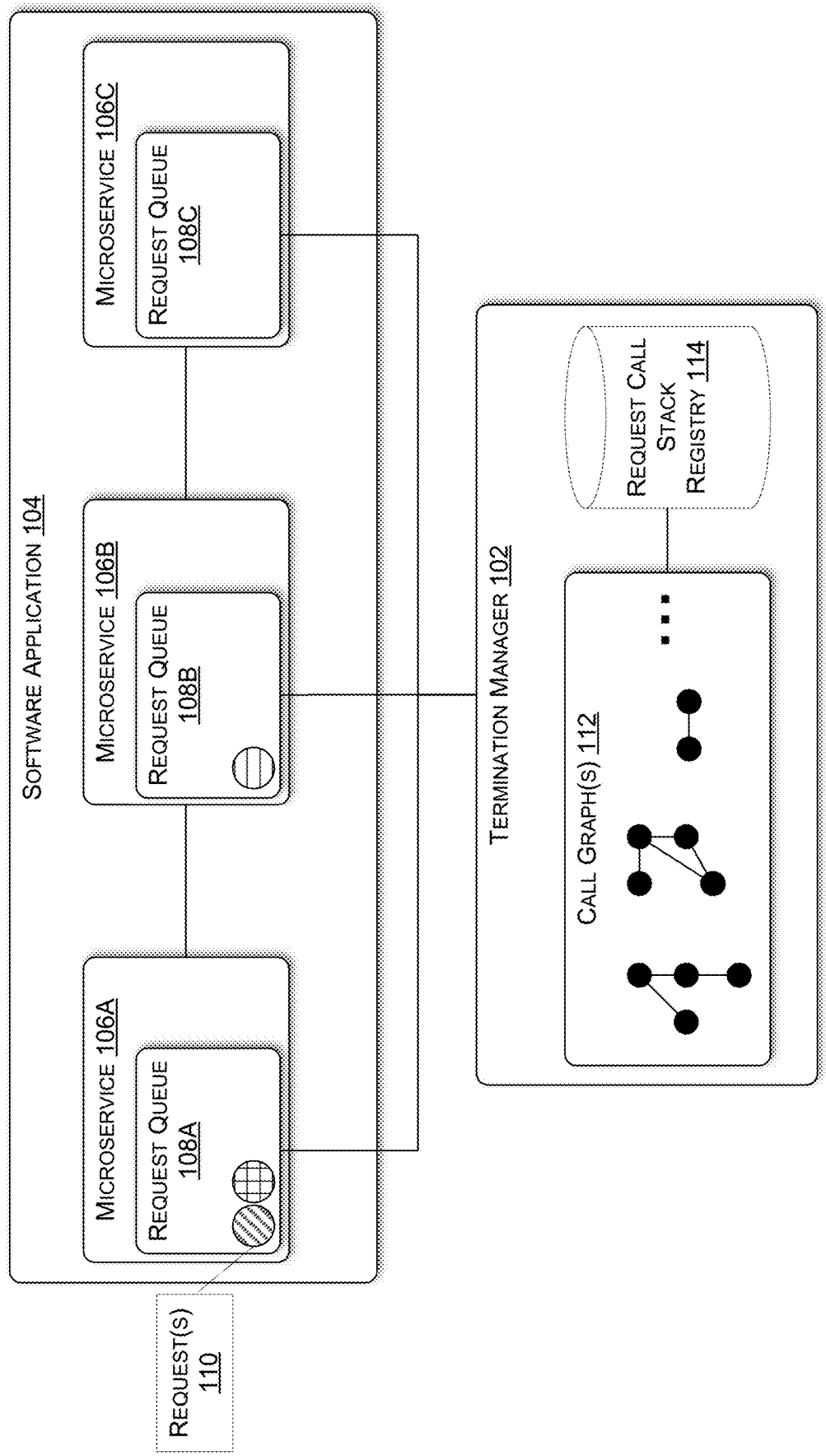
FIG. 1 is a block diagram of a system for call graph-based microservice termination.

FIG. 1 illustrates an example system 100 in which a termination manager 102 analyzes a software application 104 comprising a plurality of microservices 106A-106C. It should be understood that the software application 104 can contain any number of microservices 106. Each microservice 106A-106C contains a corresponding request queue 108A-108C. A request queue 108A tracks one or more requests 110 that await processing by the associated microservice 106A. When a microservice 106A finishes processing a request 110, the request 110 can proceed to a different request queue 108B for additional processing. As will be elaborated upon below, the type of microservice 106 and number of microservices 106 invoked by an individual request 110 varies based on the technical needs of the request 110. For example, a simple request 110 may only go through two microservices 106 while a complex request 110 may require processing by several microservices. In addition, a request 110 may return to a microservice 106A for additional processing after being processed by another microservice 106B.

To track the outstanding requests 110, the termination manager 102 retrieves the requests 110 from the request queues 108A-108C of the microservices 106A-106C. For each request 110, the termination manager 102 constructs a corresponding call graph 112. As mentioned above, a call graph represents a flow of operations for an associated request 110 through the software application 104. As shown in FIG. 1, each call graph 112 is comprised of nodes where each node represents an individual microservice 106 that is invoked by the associated request 110. The call graphs 112 are subsequently stored in a request call stack registry 114 for later reference by the termination manager 102 as the software application 104 processes the outstanding requests 110. As mentioned above, a call graph 112 can be implemented using any suitable method such as a data structure to represent the operational flow of a request 110.

Figure 2A:
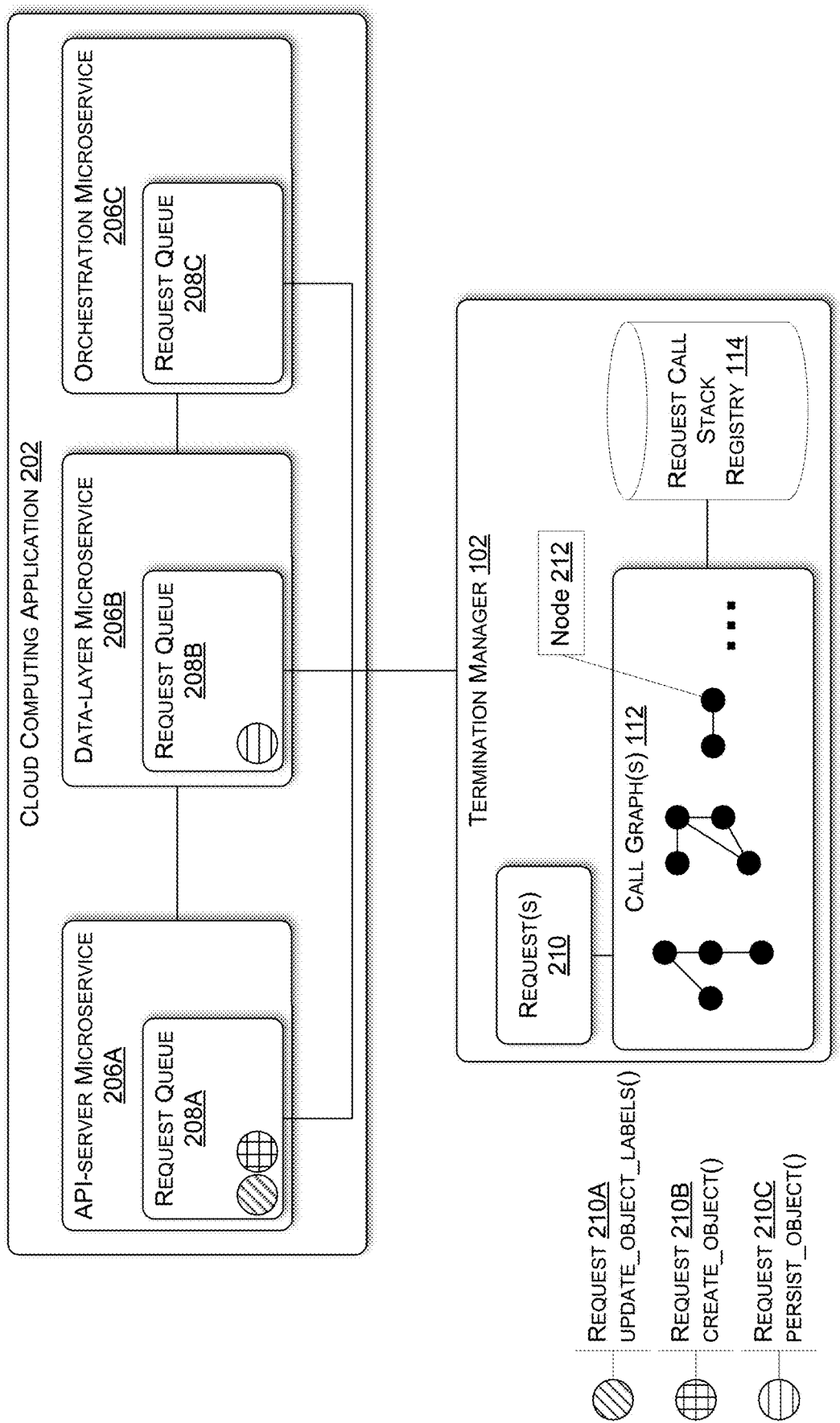
FIG. 2A illustrates an example system in preparation for microservice termination.

Turning now to FIG. 2A, an example system 200 is shown in which a cloud computing application 202 is terminated by a termination manager 102. In the example of FIG. 2A, an operator may wish to deploy an updated version of the cloud computing application 202. As such, the cloud computing application 202 must be terminated beforehand. As shown, the cloud computing application 202 comprises an API-server microservice 206A, a data-layer microservice 206B, and an orchestration microservice 206C. Similar to the microservices 106 discussed above, each of the API-server microservice 206A, the data-layer microservice 206B, and the orchestration microservice 206C contains a request queue 208A-208C. The request queue 208A for the API-server microservice 206A contains a first request 210A, update_object_labels( ) and a second request 210B create_object( ) Meanwhile, the request queue 208B contains a third request 210C persist_object( ) In general, the requests 210A-210C relate to creating and managing instances of cloud computing objects such as virtual machines, containers, and the like. In order to safely terminate the cloud computing application 202, the system 200 processes all outstanding requests 214 to prevent failures due to missing microservices 206.

To begin terminating the cloud computing application 202, the termination manager 102 receives and/or accesses the requests queues 208A-208C for each of the API-server microservice 206A, the data-layer microservice 206B, and the orchestration microservice 206C. The termination manager 102 then generates a call graph 112 for each of the outstanding requests 210. Each call graph contains a plurality of nodes 212. The number of nodes 212 in a given call graph 112 is the number of microservices 206 whose functionality is invoked by the associated request 210. As will be shown below, a relatively simple request 210 such as the request 210A update_object_labels( ) may very few microservices 206. Conversely, a more complex request 210 such as the request 210B create_object( ) may utilize many microservices 206 and also utilize the same microservices 206 several times. The operational flow captured by a call graph 112 can also be referred to as a call stack hence the call stack registry 114.

From an initial analysis of the request queues 208, the termination manager 102 may detect that the request queue 208C for the orchestration microservice 206C is empty. This indicates that there are currently no outstanding requests 210 awaiting processing by the orchestration microservice 206C. In typical approaches to microservice termination, the orchestration microservice 206C would be considered safe to terminate. However, in the event one of the outstanding requests 210 attempts to invoke the orchestration microservice 206C at a later time, a failure will occur as the orchestration microservice 206C has been terminated.

Figure 2B:
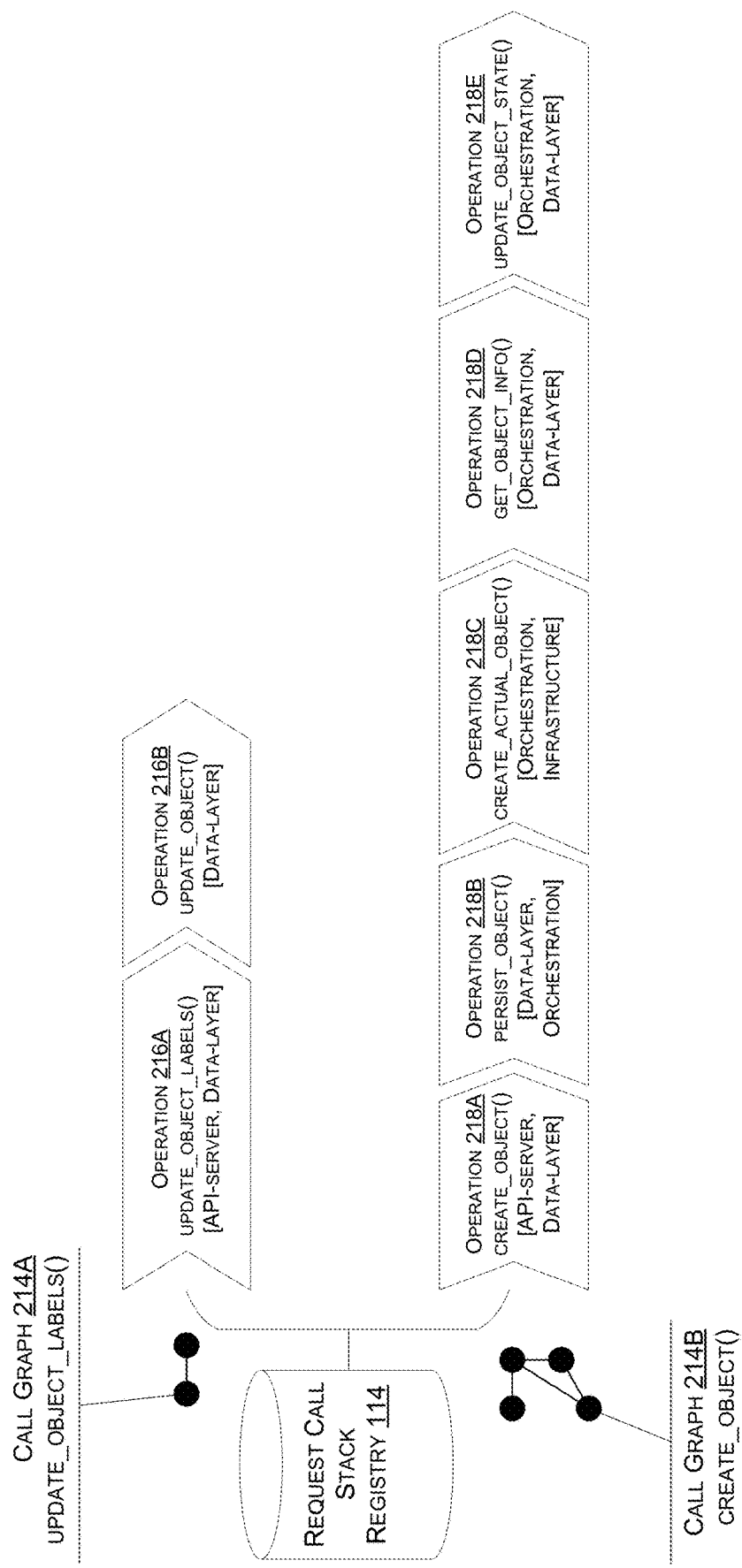
FIG. 2B the example system performing analysis of call graphs generated from outstanding requests.

In contrast, as shown in FIG. 2B, the termination manager 102 can analyze the request call stack registry 114 to determine if a microservice 206 is eligible for termination. Stated another way, if a microservice 206 does not appear in any of the call graphs 112 for the outstanding requests 210, the termination manager 102 can determine that the microservice 206 is not needed to process the outstanding requests 210 and can be safely terminated. Conversely, the termination manager 102 can detect from the call graphs 112 that one of the outstanding requests 210 will invoke the microservice 206 at a later point in time. In response, the microservice 206 is not terminated despite having an empty request queue 208. For example, the request call stack registry 114 may contain a first call graph 214A update_object_labels( ) that relates to the request 210A update_object_labels( ). The request call stack registry 114 can also contain a second call graph 214B create_object( ) that relates to the request 214B create_object( ). As mentioned above, a call graph 214A captures an operational flow for an associated request 210A where the operational flow is a sequence of operations invoking the functionality of one or more microservices 206.

For example, the call graph 214A indicates that the operational flow for the associated request 210A involves a first operation 216A which is the initial request 210A to be processed by the API-server microservice 206A then transferred to the data-layer microservice 206B. The call graph 214A proceeds to a second operation 216B update_object( ) where the data-layer microservice 206B executes the actual process of updating the object (e.g., a virtual machine, a container). In contrast, the call graph 214B is comparatively more complex, involving five operations 218A-218E spanning several microservices 206. For instance, operation 218A is the initial request 210B create_object( ) which is processed by the API-server microservice 206A and directed to the data-layer microservice 206B for execution. For the request 210B, the call graph 214B proceeds to operation 218B where a persist_object( ) command is initiated by the data-layer microservice 206B and executed by the orchestration microservice 206C. In various examples, as a given request 210A completes an operation 216A, a node 212 representing a microservice 206A is removed from the call graph 214A. For example, when the API-server microservice 206A completes operation 216A, the first node 212 of the call graph 214A is removed. As such, a request 210A is considered complete when all nodes 212 are removed from the associated call graph 214A.

From an analysis of the call graphs 214A and 214B, the termination manager 102 can determine that a microservice 206 is currently in use (e.g., an outstanding request 210 in a request queue 208). In addition, the termination manager 102 can determine that a microservice 206 will be used at a later point in time because the microservice 206 is named in the call graphs 214. Accordingly, microservices 206 that are needed presently or eventually to process outstanding requests 210 are not terminated. In the example of FIG. 2A, the orchestration microservice 206C is not terminated despite having an empty requests queue 208C.

Figure 3A:
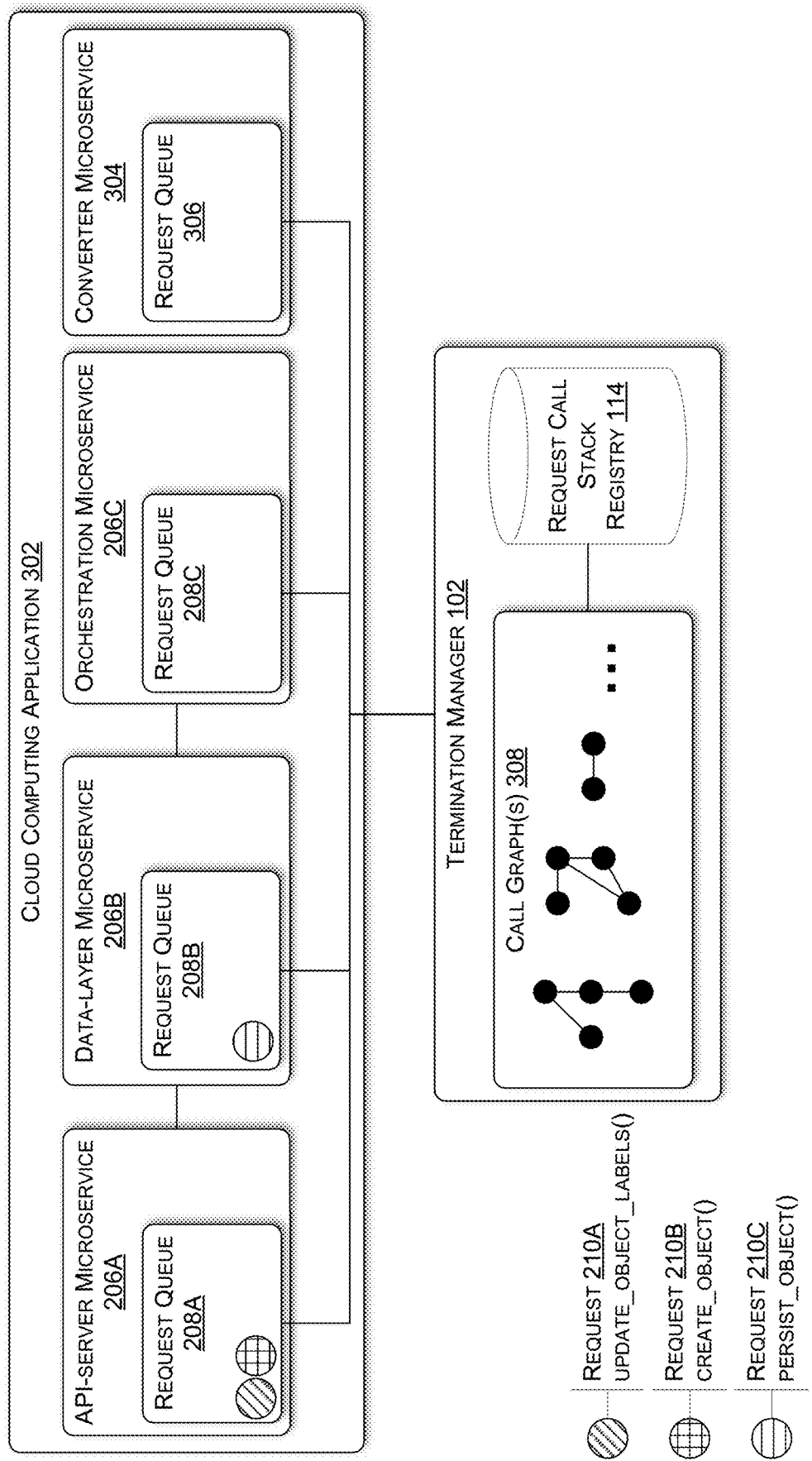
FIG. 3A illustrates an example system performing initial analysis of call graphs to detect unused microservices that can be terminated.

Proceeding to FIG. 3A, an alternative example system 300 for terminating a cloud computing application 302 is shown and described. Similar to the cloud computing application 202 discussed above, the cloud computing application 302 comprises an API-service microservice 206A, a data-layer microservice 206B, and an orchestration microservice 206C. In addition, the cloud computing application 302 further comprises a converter microservice 304 which includes an associated request queue 306. To begin terminating the cloud computing application 302, the termination manager 102 retrieves the request queues 208A-208C and 306 to detect any outstanding requests 210. As discussed above, the termination manager 102 then generates a call graphs for each of the outstanding requests 210 to capture the operational flow of each request 210. The call graphs 308 are then stored in a request call stack registry 114. From an analysis of the call graphs 308, the termination manager 102 can determine which microservices 206 and/or 304 are required to finish processing the outstanding requests 210.

Figure 3B:
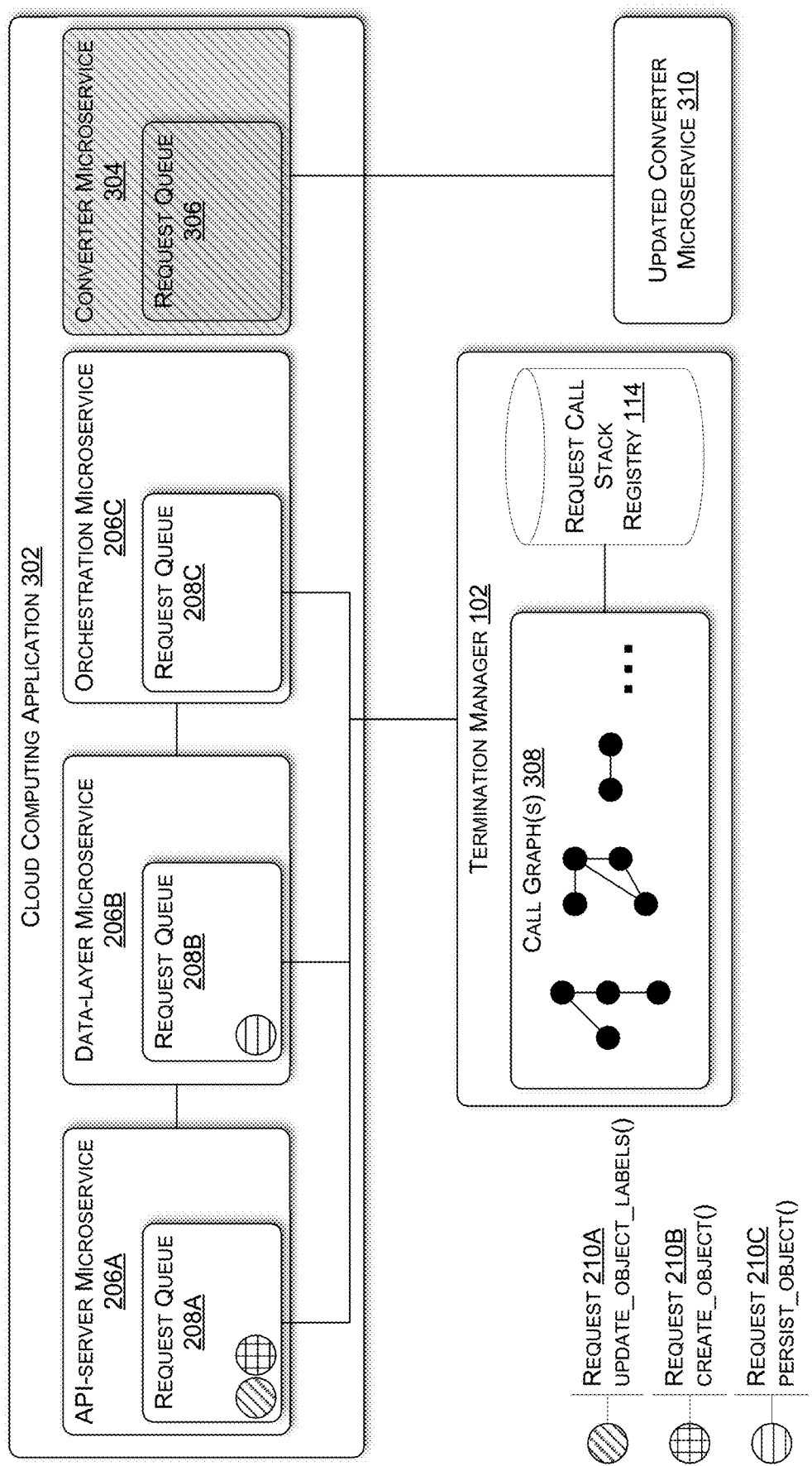
FIG. 3B illustrates an example system terminating an unused microservice.

Stated another way, the termination manager 102 can determine if any of the microservices 206 and/or 304 are eligible for immediate termination. For example, the termination manager may determine that the converter microservice 304 does not appear in any of the call graphs 308 (e.g., FIG. 2B). As shown in FIG. 3B, the converter microservice, is accordingly terminated as indicated by the shading. In this way, the termination manager 102, via the call graphs 308, can accelerate the process of termination for the cloud computing application 302 by terminating unneeded microservices 206 and/or 304. Consequently, the cloud computing application 302 can be updated concurrently or in parallel with the termination manager 102. For instance, as the converter microservice 304 is terminated, an updated converter microservice 310 is deployed to the cloud computing application 302. As such, by reducing the time required to terminate the microservices 206 and 304 of the cloud computing application 302, the termination manager 102 also reduces the time required to deploy updates. Moreover, by not terminating microservices 206 that are needed to process outstanding requests 210, the termination manager 102 maintains high service availability and prevents failures due to mismatched versions or missing microservices 206.

Figure 4A:
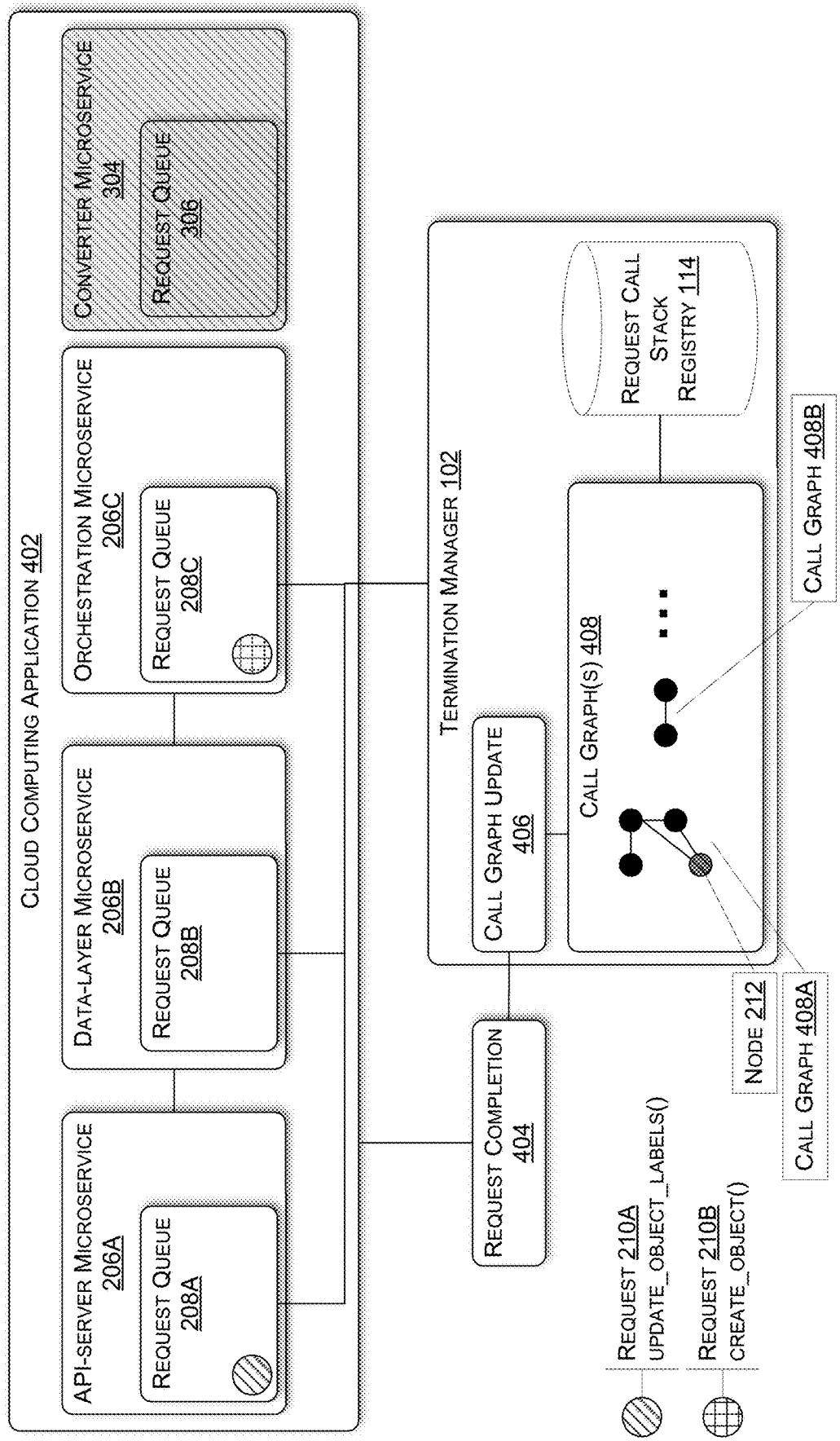
FIG. 4A illustrates an example system in a first step of a process for terminating a plurality of microservices.

Turning now to FIG. 4A, another example system 400 for fully terminating a cloud computing application 402 is shown and described. As shown in FIG. 4A, the cloud computing application 402 comprises an API-server microservice 206A, a data-layer microservice 206B, and an orchestration microservice 206C which are currently active, and a converter microservice 304 which has been terminated. As discussed above with respect to FIGS. 3A-3B, the converter microservice 304 can be terminated in response to an analysis of the call graphs 308 indicating that the converter microservice 304 is not needed to process the outstanding requests 210. As unneeded microservices such as the converter microservice 304 are terminated, the cloud computing application 402 can process outstanding requests 210 in parallel.

In the example of FIG. 4A, a request 210B create_object( ) in the request queue 208C of the orchestration microservice 206C has completed causing a generation of a request completion 404. In response to detecting the request completion 404, the termination manager 102 executes a call graph update 406. In various examples, the call graph update 406 involves monitoring the requests queues 208 for reevaluating the call graphs 408. This enables the termination manager 102 to determine which microservices 206 have finished processing the associated request 210B and if any microservices 206 are eligible for termination. For example, the orchestration microservice 206C is finished processing the request 210B. In response, a node 212 representing the orchestration microservice 206C is removed from an associated call graph 408A. In various examples, the request 210B may require additional processing by other microservices 206 such as the data-layer microservice 206B. Accordingly, other nodes of the call graph are not removed by the call graph update 406.

Figure 4B:
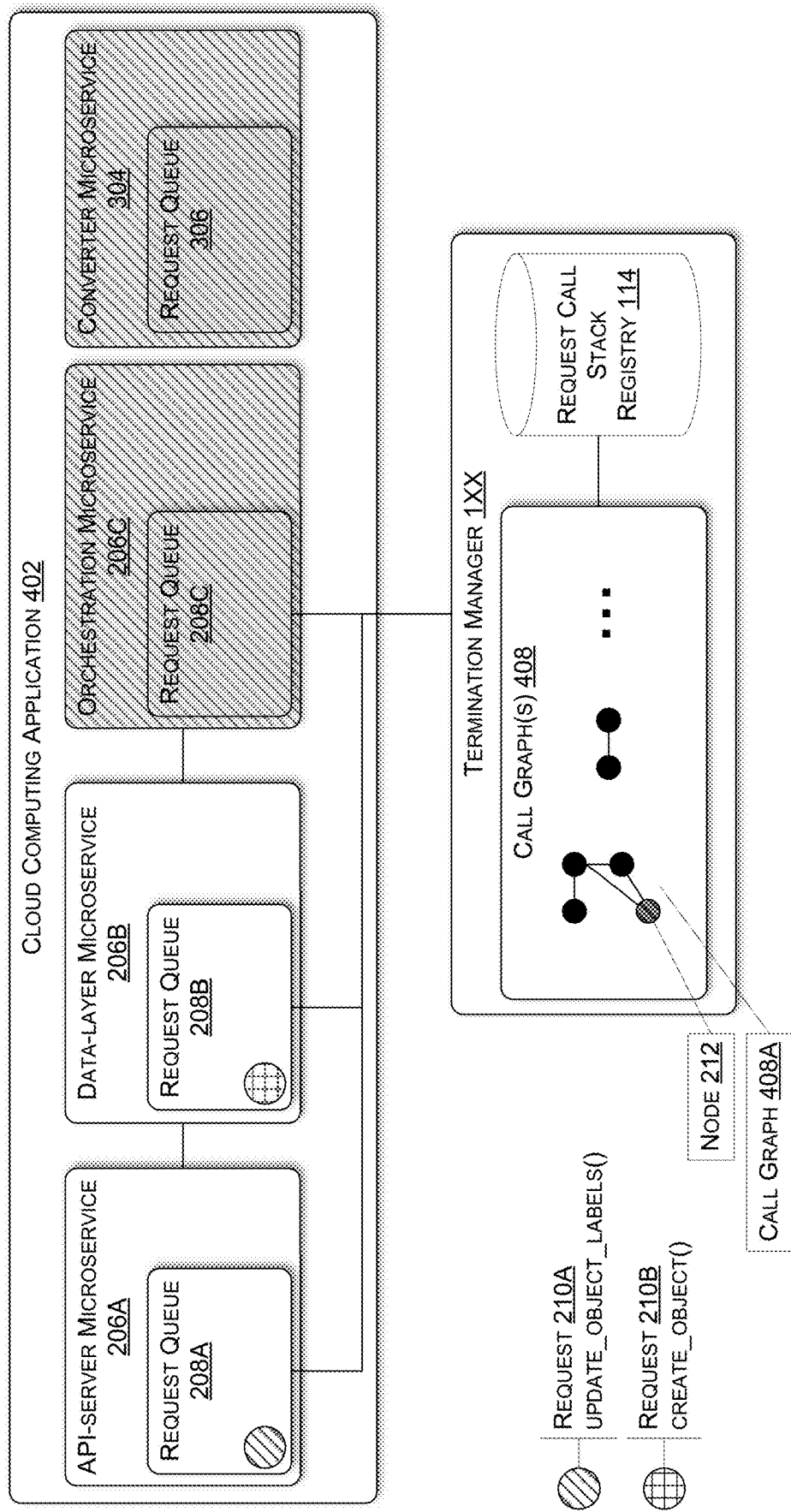
FIG. 4B illustrates an example system in a second step of a process for terminating a plurality of microservices.

As shown in FIG. 4B, after removing the node 212 representing the orchestration microservice 206C the termination manager 102 can determine that the orchestration microservice 206C does not appear in any of the call graphs 408. In response, the orchestration microservice 206C is terminated. As mentioned above, terminated microservices 206 can be accordingly replaced by updated versions while outstanding requests 210 are processed. As indicated by the call graph 408A (see, FIG. 2B) the cloud computing application 402 continues to process the request 210B using the remaining API-server microservice 206A and the data-layer microservice 206B gradually removing nodes 212 from the call graph 408A until the request 210B is complete.

Figure 4C:
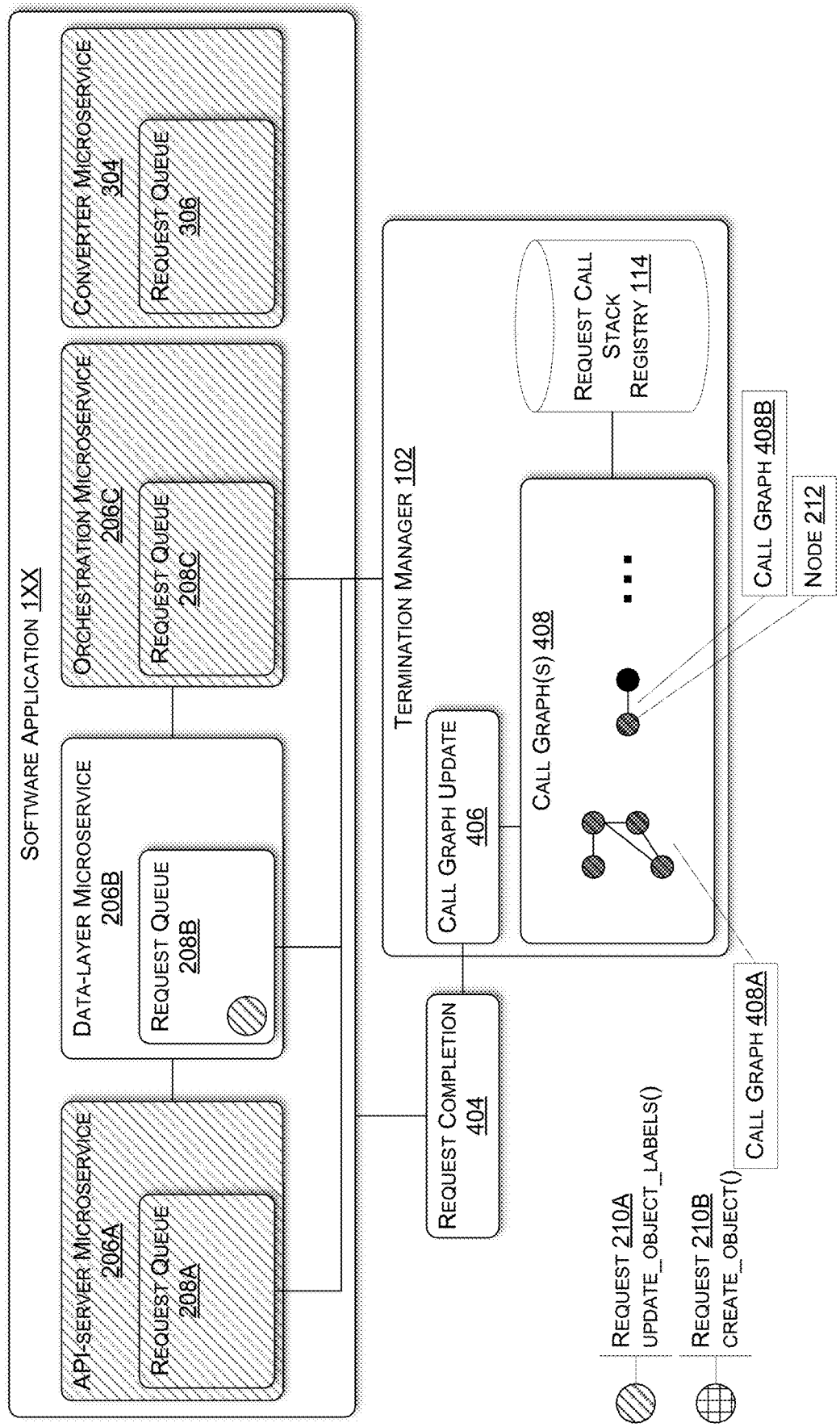
FIG. 4C illustrates an example system in a third step of a process for terminating a plurality of microservices.

Turning now to FIG. 4C, all of the nodes 212 of the call graph 408A are removed as indicated by the shading to indicate that the request 210B create_object( ) has been fully processed by the cloud computing application 402. Meanwhile, the request 210A update_object_labels( ) is being processed by the data-layer microservice 206B after initial processing was completed by the API-server microservice 206A. As shown in the call graph 408B, a node 212 representing the API-server microservice 206A has been removed via a call graph update 406 in response to a request completion 404. In addition, the termination manager 102 can determine that the API-server microservice 206A does not appear in any of the remaining call graphs 408 indicating that the API-server microservice 206A is eligible for termination. In response, the API-server microservice 206A is terminated as shown by the shading. As the data-layer microservice 206B finishes processing the request 210A, another request completion 404 is generated to cause a call graph update 406. In turn, the call graph update 406 causes the termination manager 102 to remove the final node 212 from the call graph 408B.

Figure 4D:
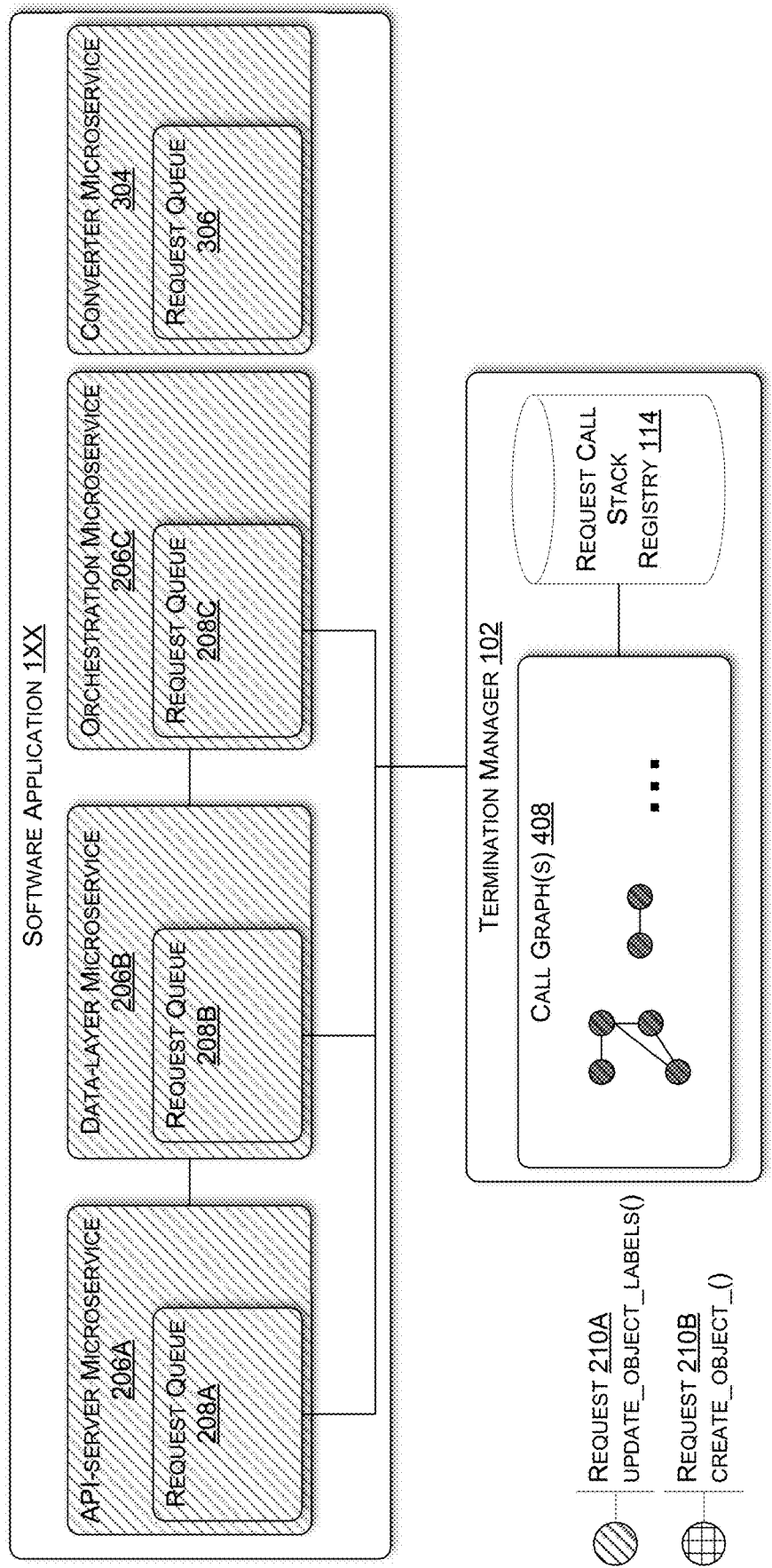
FIG. 4D illustrates an example system in a fourth step of a process for terminating a plurality of microservices.

As shown in FIG. 4D, the termination manager 102 repeat the process shown in FIGS. 4A-4C to gradually process the outstanding requests 210 and terminate all the microservices 206 accordingly. As the operations of each request 210 nodes 212 are removed from the associated call graphs 408. Eventually, all nodes 212 are removed from the call graphs 408 indicating that all of the outstanding requests 210 have been completed and all microservices 206 terminated accordingly. In addition to determining that a microservice 206A does not appear in any of the call graphs 408, the eligibility of a microservice 206A for termination can be further confirmed by the termination manager 102 by ensuring the request queues 208A for a microservice 206A does not contain any outstanding requests 210.

Figure 5:
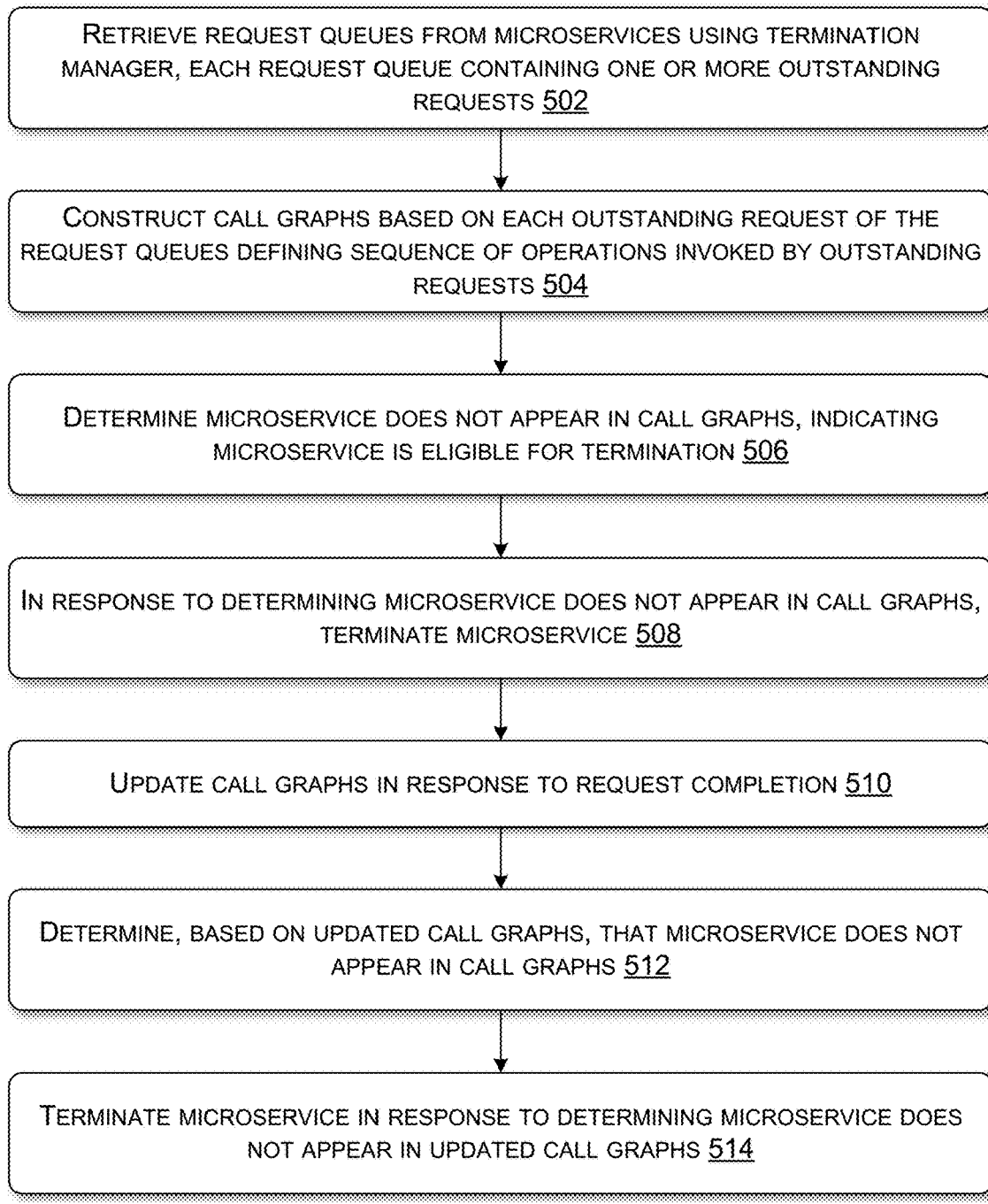
FIG. 5 is a flow diagram showing aspects of a routine for utilizing the network effect of end-user viral adoption of services and applications by clustering users based on characteristics of requests to configure new tenants.

Turning now to FIG. 5, aspects of a routine 500 for accelerated microservice termination while maintaining high availability are shown and described. With reference to FIG. 5, the routine 500 begins at operation 502, where a termination manager 102 retrieves a plurality of request queues 208 from a corresponding plurality of microservices 206 where each request queue contains one or more outstanding requests 210.

Next, at operation 504, the termination manager 102 constructs a plurality of call graphs based on each of the outstanding requests 210. As discussed above, a call graph 112 captures the operational flow of an associated request 210. Stated another way, a call graphs 112 defines a sequence of operations invoked by each of the outstanding requests 210 where an operation involves invoking a functionality of a microservice 206.

Then, at operation 506, the termination manager determines that a microservice 304 of the plurality of microservices 206A-206C and 304 does not appear in the call graphs 112. When a microservice 304 does not appear in the call graphs 112, it is determined that the microservice 304 is not needed to process the outstanding requests 210 and is thus eligible for termination.

Subsequently, at operation 508 in response to determining that the microservice 304 does not appear in the call graphs 112, the microservice 304 is terminated. As discussed above, by terminating unneeded microservices early, the termination manager 102 reduces the time required to fully terminate a software application 104 thereby increasing efficiency and improving performance.

Next, at operation 510, in response to a request completion 404, the termination manager 102 reevaluates and updates the call graphs 408. For instance, as discussed above with respect to FIG. 4A, the termination manager 102 can remove a node 212 from a call graph 408A to indicate that an associated request 210 has finished processing by a microservice 206 represented by the node 212.

Then, at operation 512, the termination manager 102 determines that a microservice does not appear in any of the updated call graphs 408. This can be a result of removing a node in response to a request completion 404 indicating that the microservice 206 is no longer needed to process outstanding requests 210.

Finally, at operation 514, in response to determining that the microservice 206 does not appear in any of the updated call graphs 408, the microservice 206 is terminated by the termination manager 102.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in other ways. In one example, the routine 500 is implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
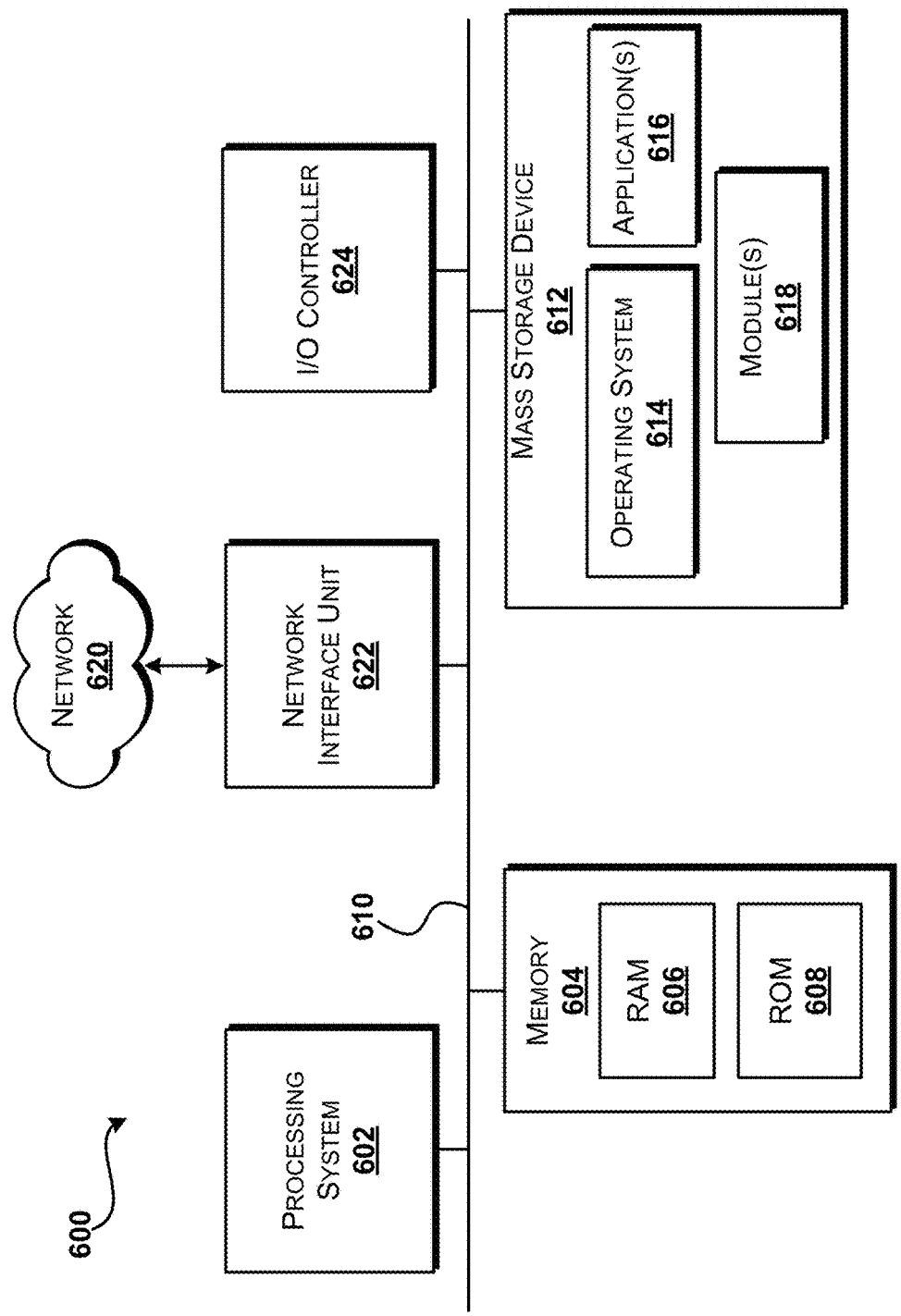
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
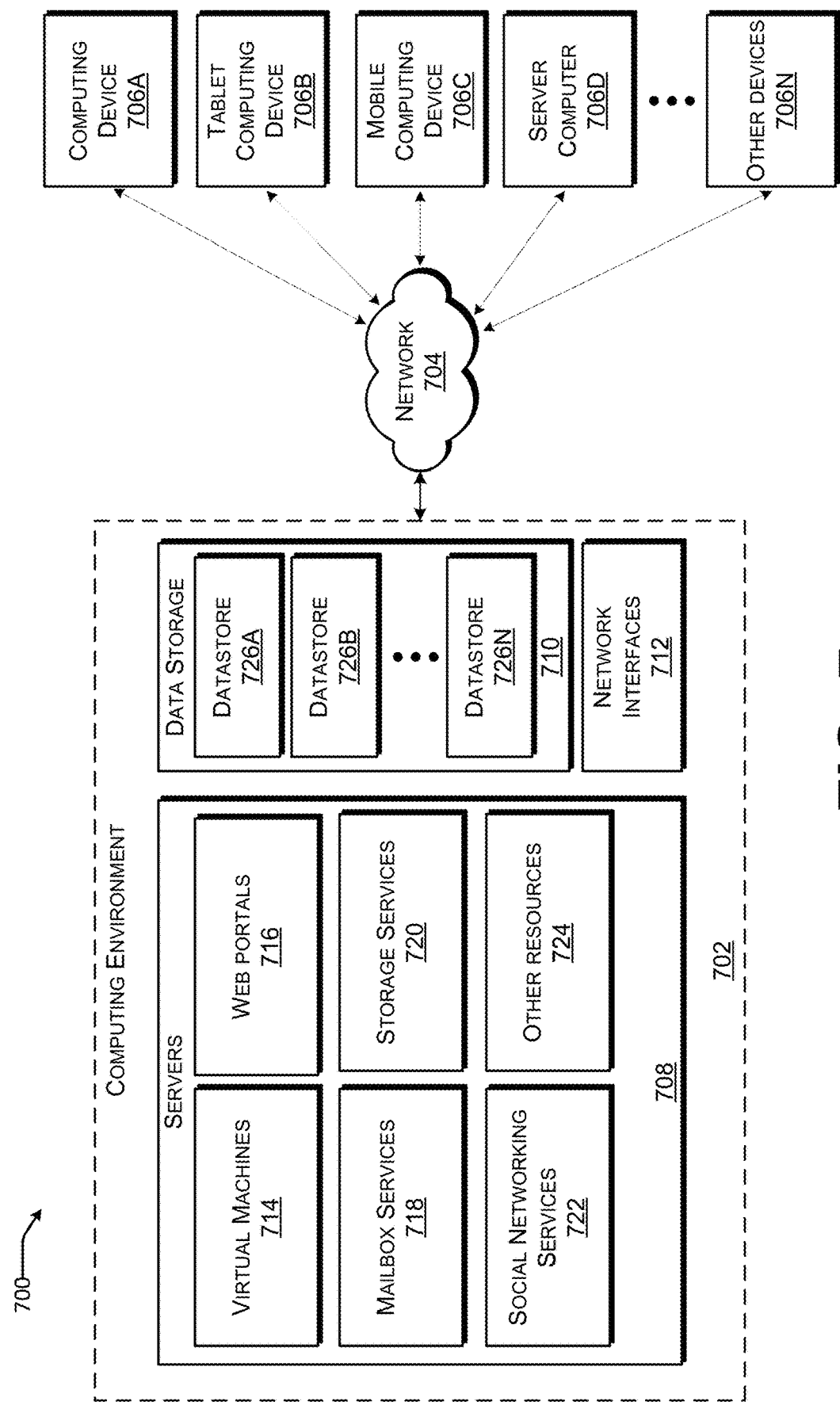
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722.

As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for terminating a plurality of microservices to ensure maximal availability comprising: retrieving a plurality of request queues from the plurality of microservices using a termination manager, wherein a request queue contains one or more outstanding requests; constructing a plurality of call graphs based on each of the one or more outstanding requests of the plurality of request queues defining a sequence of operations invoked by each of the one or more outstanding requests; determining that a microservice of the plurality of microservices does not appear in the plurality of call graphs indicating that the microservice is eligible for termination; in response to determining that the microservice of the plurality of microservices does not appear in the plurality of call graphs, terminating the microservice; updating the plurality of call graphs by monitoring the plurality of request queues in response to a completion of an outstanding request wherein the completion of the outstanding request causes a removal of the outstanding request from a request queue of the plurality of request queues; determining, based on the updated plurality of call graphs, that a microservice of the plurality of microservices does not appear in any of the updated plurality of call graphs following the completion of the outstanding request; and terminating the microservice in response to determining that the microservice of the plurality of microservices does not appear in any of the updated plurality of call graphs.

Example Clause B, the method of Example Clause A, wherein the call graph is updated until all microservices of the plurality of microservices are terminated.

Example Clause C, the method Example Clause A or Example Clause B, wherein: an application comprises the plurality of microservices; and the plurality of microservices is terminated in response to a deployment an updated version of the application.

Example Clause D, the method of any one of Example Clause A through C, wherein an outstanding request comprises a call stack defining a plurality of operations, an individual operation invoking a functionality of a corresponding plurality of microservices.

Example Clause E, the method of any one of Example Clause A through D, wherein an individual call graph for an individual request comprises a plurality of nodes, each node representing an associated microservice invoked by the individual request.

Example Clause F, the method of Example Clause E, wherein a node of the plurality of nodes is removed from the call graph in response to a request completion, the removal of the node from all of the plurality of call graphs causing a termination of a microservice represented by the node.

Example Clause G, the method of Example Clause F, wherein the plurality of nodes is sequentially removed from each call graph of the plurality of call graphs to terminate the plurality of microservices.

Example Clause H, a system for reducing a time required for terminating a plurality of microservices while preventing request processing failures comprising: one or more processing units; a computer readable medium having encoded thereon, computer-readable instructions that when executed by the one or more processing units causes the system to: retrieve a plurality of request queues from the plurality of microservices using a termination manager, wherein a request queue contains one or more outstanding requests; construct a plurality of call graphs based on each of the one or more outstanding requests of the plurality of request queues defining a sequence of operations invoked by each of the one or more outstanding requests; determining that a microservice of the plurality of microservices does not appear in the plurality of call graphs indicating that the microservice is eligible for termination; in response to determining that the microservice of the plurality of microservices does not appear in the plurality of call graphs, terminating the microservice; update the plurality of call graphs by monitoring the plurality of request queues in response to a completion of an outstanding request wherein the completion of the outstanding request causes a removal of the outstanding request from a request queue of the plurality of request queues containing the outstanding request; determine, based on the updated plurality of call graphs, that a microservice of the plurality of microservices does not appear in any of the updated plurality of call graphs following the completion of the outstanding request; and terminate the microservice in response to determining that the microservice of the plurality of microservices does not appear in any of the updated plurality of call graphs.

Example Clause I, the system of Example Clause H, wherein the call graph is updated until all microservices of the plurality of microservices are terminated.

Example Clause J, the system of Example Clause H or Example Clause I, wherein: an application comprises the plurality of microservices; and the plurality of microservices is terminated in response to a deployment an updated version of the application.

Example Clause K, the system of any one of Example Clause H through J, wherein an outstanding request comprises a call stack defining a plurality of operations, an individual operation invoking a functionality of a corresponding plurality of microservices.

Example Clause L, the system of any one of Example Clause H through K, wherein an individual call graph for an individual request comprises a plurality of nodes, each node representing an associated microservice invoked by the individual request.

Example Clause M, the system of Example Clause L, wherein a node of the plurality of nodes is removed from the call graph in response to a request completion, the removal of the node from all of the plurality of call graphs causing a termination of a microservice represented by the node.

Example Clause N, the system of Example Clause M, wherein the plurality of nodes is sequentially removed from each call graph of the plurality of call graphs to terminate the plurality of microservices.

Example Clause O, a computer-readable storage medium having encoded thereon, computer-readable instructions that when executed by a system causes the system to: retrieve a plurality of request queues from the plurality of microservices using a termination manager, wherein a request queue contains one or more outstanding requests; construct a plurality of call graphs based on each of the one or more outstanding requests of the plurality of request queues defining a sequence of operations invoked by each of the one or more outstanding requests; determining that a microservice of the plurality of microservices does not appear in the plurality of call graphs indicating that the microservice is eligible for termination; in response to determining that the microservice of the plurality of microservices does not appear in the plurality of call graphs, terminating the microservice; update the plurality of call graphs by monitoring the plurality of request queues in response to a completion of an outstanding request wherein the completion of the outstanding request causes a removal of the outstanding request from a request queue of the plurality of request queues containing the outstanding request; determine, based on the updated plurality of call graphs, that a microservice of the plurality of microservices does not appear in any of the updated plurality of call graphs following the completion of the outstanding request; and terminate the microservice in response to determining that the microservice of the plurality of microservices does not appear in any of the updated plurality of call graphs.

Example Clause P, the computer-readable storage medium of Example Clause O, wherein: an application comprises the plurality of microservices; and the plurality of microservices is terminated in response to a deployment an updated version of the application.

Example Clause Q, the computer-readable storage medium of Example Clause O or Example Clause P, wherein an outstanding request comprises a call stack defining a plurality of operations, an individual operation invoking a functionality of a corresponding plurality of microservices.

Example Clause R, the computer-readable storage medium of any one of Example Clause O through Q, wherein an individual call graph for an individual request comprises a plurality of nodes, each node representing an associated microservice invoked by the individual request.

Example Clause S, the computer-readable storage medium of Example Clause R, wherein a node of the plurality of nodes is removed from the call graph in response to a request completion, the removal of the node from all of the plurality of call graphs causing a termination of a microservice represented by the node.

Example Clause T, the computer-readable storage medium of Example Clause S, wherein the plurality of nodes is sequentially removed from each call graph of the plurality of call graphs to terminate the plurality of microservices.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different postures).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for terminating a plurality of microservices to ensure maximal availability comprising:
    retrieving a plurality of request queues from the plurality of microservices using a termination manager, wherein a request queue contains one or more outstanding requests;
    constructing a plurality of call graphs based on each of the one or more outstanding requests of the plurality of request queues defining a sequence of operations invoked by each of the one or more outstanding requests;
    determining that a microservice of the plurality of microservices does not appear in the plurality of call graphs indicating that the microservice is eligible for termination;
    in response to determining that the microservice of the plurality of microservices does not appear in the plurality of call graphs, terminating the microservice;
    updating the plurality of call graphs by monitoring the plurality of request queues in response to a completion of an outstanding request wherein the completion of the outstanding request causes a removal of the outstanding request from a request queue of the plurality of request queues;
    determining, based on the updated plurality of call graphs, that another microservice of the plurality of microservices does not appear in any of the updated plurality of call graphs following the completion of the outstanding request; and
    terminating the other microservice in response to determining that the other microservice of the plurality of microservices does not appear in any of the updated plurality of call graphs.

2. The method of claim 1, wherein the call graph is updated until all microservices of the plurality of microservices are terminated.

3. The method of claim 1, wherein:
    an application comprises the plurality of microservices; and
    the plurality of microservices is terminated in response to a deployment of an updated version of the application.

4. The method of claim 1, wherein an outstanding request comprises a call stack defining a plurality of operations, an individual operation invoking a functionality of a corresponding plurality of microservices.

5. The method of claim 1, wherein an individual call graph for an individual request comprises a plurality of nodes, each node representing an associated microservice invoked by the individual request.

6. The method of claim 5, wherein a node of the plurality of nodes is removed from the call graph in response to a request completion, the removal of the node from all of the plurality of call graphs causing a termination of a microservice represented by the node.

7. The method of claim 6, wherein the plurality of nodes is sequentially removed from each call graph of the plurality of call graphs to terminate the plurality of microservices.

8. A system for reducing a time required for terminating a plurality of microservices while preventing request processing failures comprising:
    one or more processing units;
    a computer readable medium having encoded thereon, computer-readable instructions that when executed by the one or more processing units causes the system to:
        retrieve a plurality of request queues from the plurality of microservices using a termination manager, wherein a request queue contains one or more outstanding requests;
        construct a plurality of call graphs based on each of the one or more outstanding requests of the plurality of request queues defining a sequence of operations invoked by each of the one or more outstanding requests;
        determining that a microservice of the plurality of microservices does not appear in the plurality of call graphs indicating that the microservice is eligible for termination;

in response to determining that the microservice of the plurality of microservices does not appear in the plurality of call graphs, terminating the microservice;

update the plurality of call graphs by monitoring the plurality of request queues in response to a completion of an outstanding request wherein the completion of the outstanding request causes a removal of the outstanding request from a request queue of the plurality of request queues containing the outstanding request;

determine, based on the updated plurality of call graphs, that another microservice of the plurality of microservices does not appear in any of the updated plurality of call graphs following the completion of the outstanding request; and terminate the other microservice in response to determining that the other microservice of the plurality of microservices does not appear in any of the updated plurality of call graphs.

9. The system of claim 8, wherein the call graph is updated until all microservices of the plurality of microservices are terminated.

10. The system of claim 8, wherein:
an application comprises the plurality of microservices; and
the plurality of microservices is terminated in response to a deployment of an updated version of the application.

11. The system of claim 8, wherein an outstanding request comprises a call stack defining a plurality of operations, an individual operation invoking a functionality of a corresponding plurality of microservices.

12. The system of claim 8, wherein an individual call graph for an individual request comprises a plurality of nodes, each node representing an associated microservice invoked by the individual request.

13. The system of claim 12, wherein a node of the plurality of nodes is removed from the call graph in response to a request completion, the removal of the node from all of the plurality of call graphs causing a termination of a microservice represented by the node.

14. The system of claim 13, wherein the plurality of nodes is sequentially removed from each call graph of the plurality of call graphs to terminate the plurality of microservices.

15. A computer readable storage medium having encoded thereon, computer-readable instructions that when executed by a system causes the system to:
retrieve a plurality of request queues from the plurality of microservices using a termination manager, wherein a request queue contains one or more outstanding requests;

construct a plurality of call graphs based on each of the one or more outstanding requests of the plurality of request queues defining a sequence of operations invoked by each of the one or more outstanding requests;

determining that a microservice of the plurality of microservices does not appear in the plurality of call graphs indicating that the microservice is eligible for termination;

in response to determining that the microservice of the plurality of microservices does not appear in the plurality of call graphs, terminating the microservice;

update the plurality of call graphs by monitoring the plurality of request queues in response to a completion of an outstanding request wherein the completion of the outstanding request causes a removal of the outstanding request from a request queue of the plurality of request queues containing the outstanding request;

determine, based on the updated plurality of call graphs, that another microservice of the plurality of microservices does not appear in any of the updated plurality of call graphs following the completion of the outstanding request; and terminate the other microservice in response to determining that the other microservice of the plurality of microservices does not appear in any of the updated plurality of call graphs.

16. The computer-readable storage media of claim 15, wherein:
an application comprises the plurality of microservices; and
the plurality of microservices is terminated in response to a deployment of an updated version of the application.

17. The computer-readable storage media of claim 15, wherein an outstanding request comprises a call stack defining a plurality of operations, an individual operation invoking a functionality of a corresponding plurality of microservices.

18. The computer-readable storage media of claim 15, wherein an individual call graph for an individual request comprises a plurality of nodes, each node representing an associated microservice invoked by the individual request.

19. The computer-readable storage media of claim 18, wherein a node of the plurality of nodes is removed from the call graph in response to a request completion, the removal of the node from all of the plurality of call graphs causing a termination of a microservice represented by the node.

20. The computer-readable storage media of claim 19, wherein the plurality of nodes is sequentially removed from each call graph of the plurality of call graphs to terminate the plurality of microservices.

* * * * *